United States Patent [19]

Liebrecht et al.

[11] Patent Number: 5,641,531
[45] Date of Patent: Jun. 24, 1997

[54] NUTRITIONAL LIQUID SUPPLEMENT BEVERAGE AND METHOD OF MAKING SAME

[75] Inventors: Jeffery Wayne Liebrecht, Columbus; Terrence Bruce Mazer, Reynoldsburg; Michael Allen Chandler, Gahanna; Gerald Edward Schopinsky, Westerville; Normanella Torres Dewille, Upper Arlington, all of Ohio

[73] Assignee: Abbott Laboratories, Abbott Park, Ill.

[21] Appl. No.: 534,906

[22] Filed: Sep. 28, 1995

[51] Int. Cl.⁶ .................................................. A23C 21/10
[52] U.S. Cl. ........................ 426/583; 426/72; 426/590; 426/656; 426/658
[58] Field of Search .................................. 426/583, 656, 426/590, 658, 72

[56] References Cited

U.S. PATENT DOCUMENTS

| | | | |
|---|---|---|---|
| 3,922,375 | 11/1975 | Dalan et al. | 426/590 |
| 4,309,417 | 1/1982 | Staples | 426/583 |
| 4,486,413 | 12/1984 | Wiesenberger et al. | 426/656 |
| 4,992,282 | 2/1991 | Mehansho et al. | 426/72 |
| 5,106,836 | 4/1992 | Clemens et al. | 426/656 |
| 5,322,703 | 6/1994 | Selinger et al. | 426/583 |

FOREIGN PATENT DOCUMENTS 0486425  5/1992  European Pat. Off. ........... A23L 1/29

*Primary Examiner*—Helen Pratt
*Attorney, Agent, or Firm*—D. O. Nickey; T. D. Brainard

[57] ABSTRACT

A protein containing nutritional supplement that contains from 1 to 10% by weight of whey protein isolate, at least one source of carbohydrate, vitamins, trace minerals and ultra trace minerals and ultra trace minerals. The pH of the liquid nutritional supplement is from about 2.8 to about 3.3 and is essentially devoid of added macro-nutrients and fat. A supplement which is clear and low in viscosity, is produced by preparing (1) an acidified aqueous solution of whey protein isolate having a pH of about 2.8 to about 3.3 and (2) an aqueous solution of carbohydrate; and thereafter combining the two solutions.

15 Claims, No Drawings

NUTRITIONAL LIQUID SUPPLEMENT BEVERAGE AND METHOD OF MAKING SAME

TECHNICAL FIELD

The present invention is in the field of oral liquid nutritional supplement beverages. More specially, this invention provides a clear nutritional supplement that possesses a thin texture and a highly acceptable mouth feel. This invention also relates to a specific process for the manufacture of a clear nutritional supplement that contains up to 10% whey protein isolate by weight and has a caloric density of at least 1.0 kcal/ml.

BACKGROUND

Nutritional supplements differ generally from nutritionally complete foods in that they are not intended to provide all the human nutritional requirements, but instead are intended to supplement other nutrition sources.

Taste fatigue is a common problem in patients who require nutritional supplements on a regular basis. In addition, some patients, particularly the elderly and those with cancer, have taste aberrations and aversions to "milky" supplements. The beverage of this invention is a non-milk tasting alternative to the mostly milk-based supplements currently available. It represents an acceptable and refreshing means of supplementing energy, protein, vitamin and mineral intake in those patients who are tired of the milk based alternatives.

The present invention is intended to solve a number of concomitant problems attendant to producing a nutritional supplement drink which provides a substantially complete source of protein and a substantially complete source of carbohydrate at a high caloric density. The beverage of this invention also contains vitamins, trace minerals and ultratrace minerals. The beverage of this invention has a pleasing appearance (clear) and appealing organoleptic properties (a thin texture and good taste).

In providing a desirable level of protein (such as in the form of proteins, peptides and/or amino acids), one of the principal obstacles to be overcome is the poor taste of protein hydrolysates commonly used in such prior art products as Fortjuice, commercially available from Nutricia, and Provide™ protein rich drink commercially available from Fresenius. While easily incorporated into a nutritional supplement beverage, protein hydrolysates have a very objectionable taste that is impossible to mask completely with flavorings. These shortcomings make it difficult to obtain good patient compliance. As an alternative, intact whey protein, generally in the form of isolates or concentrates, can be used to formulate the nutritional supplement beverage. Whey protein isolates, due to their unique functionality, are the preferred source of protein over whey protein concentrates and other protein sources. Although not having the poor taste disadvantage of hydrolyzates, intact whey proteins can be difficult to incorporate into a nutritional supplement beverage so as to provide protein at a most desirable level while also allowing the nutritional supplement beverage to bear the most desirable physical and textural properties. Whey protein isolates are also viewed as nutritionally superior to hydrolyzed vegetable proteins and casein.

U.S. Pat. No. 4,992,282 discloses a vitamin and mineral fortified beverage or beverage concentrate. These beverages may be juice or cola beverages that may be carbonated. More specially this patent teaches the use of vitamin C in sugar to enhance the body's uptake of nutritionally supplemental amounts of iron compounds and calcium compounds. This patent does not suggest the use of whey protein nor the critical need for the final product pH to be in the range of 2.8 to 3.3 so as to achieve a clear product that possesses excellent mouth feel.

EP Patent 486,425 discloses a liquid oral nutritional formulation comprising, based on the total formulation calories, from 40–90% of the calories as carbohydrates, from 2 to 30% of the calories as protein, from 0 to 35% of the calories as fat and from 0 to 17% of the calories as fiber, whereby the protein source is at least 60% by weight whey protein concentrate and the pH of the formulation is from 3.5 to 3.9. The product CitriSource®-clear liquid nutritional supplement from Sandoz Nutrition is believed to be the commercial embodiment of this patent. This patent does not suggest the critical need for the use of a whey protein isolate and a pH of 2.8 to 3.3 to achieve the unexpected and highly desirable results of the present invention.

Unlike the prior art which produces "milk tasting products" the present invention provides a clear oral nutritional supplement which has a juice like consistency and flavor.

All of the shortcomings of the prior art are overcome by the present invention along with providing a nutritional supplement beverage which is appetizing in appearance by being substantially clear, and is of a thin texture and body which gives a pleasing, refreshing mouth feel while at the same time containing a significantly high caloric density. As used herein the term "thin texture" and "mouth feel" relate to viscosity of the product. The product of this invention must have a viscosity of less than 15 centipoise as determined by a Brookfield viscometer at 72° (22° C.) using a #1 spindle at 60 RPM.

In view of the present disclosure or through practice of the present invention, other advantages or the solutions to other problems may become apparent.

SUMMARY OF THE INVENTION

The present invention includes a nutritional supplement beverage and a method of making same. The present invention also includes a nutritional supplement beverage prepared by the method of the present invention.

The nutritional supplement beverage of the present invention, in broadest terms, comprises (1) water; (2) from about 1% to about 10% by weight whey protein isolate; and (3) at least one source of carbohydrate, with a preferred majority of the carbohydrate source being a complex carbohydrate. Complex carbohydrates are viewed as nutritionally superior to simple sugars such as sucrose. The beverage also includes vitamins, trace minerals and ultra-trace minerals, and is essentially free of added macro-nutrients. The pH of the nutritional supplement beverage is in the range of from about 2.8 to about 3.3, and the caloric density of the nutritional supplement beverage is at least 1.00 kcal/milliliter.

As used herein, the term "comprising" or "comprises" means various components can be conjointly employed in the beverages and concentrates of the present invention. Accordingly, the terms "comprising essentially of" and "consisting of" are embodied in the term comprising.

The whey protein can be supplied by commercially available sources. Preferably the whey protein is a whey protein isolate. Whey protein isolate is greater than 90% protein by weight and contains very low levels of fat and lactose. Commercially available sources of whey protein isolate that are useful in the present invention are BiPRO® from Le Sueur Isolates of Le Sueur, Minnesota; Provon—190 from Avonmore Ingredients, Inc. of Monroe, Wis. and Lacprodan 9212 from Royal Proteins, Inc. of Rosemont, Ill. Preferably, the nutritional supplement beverage has whey protein isolate present in the range of from about 3% to about 5% by weight of the formulation.

The carbohydrate source(s) may be from any carbohydrate source appropriate for use in nutritional beverages. The carbohydrate of the formulation may be any nutritionally acceptable carbohydrate source or blend of carbohydrate sources providing the desired amount of calories. Suitable carbohydrate sources include sucrose, glucose, fructose, corn syrup solids and maltodextrin. The DE (dextrose equivalent) of the carbohydrate component should be at least 10, preferably 20 or greater. It is preferred that the nutritional supplement beverage comprise about 15–35% sucrose and 65–85% maltodextrin based on total carbohydrate. Most preferably 25% sucrose and 75% maltodextrin. Artificial sweeteners such as saccharin and aspartame may also be used to enhance the organoleptic quality of the formulation.

With respect to the mineral content or macro-nutrient content of the instant invention it is one aspect of the invention that no macro-nutrients be added to the formulation; other than those that are inherent to the raw materials used in the preparation of the formulation. Minerals such as sodium, potassium, magnesium, calcium, phosphorous and chloride are inherently present in the whey protein isolate, the carbohydrate, the water, the vitamins, trace and ultra-trace minerals used to produce the product. For example, an inherent concentration level for potassium can be in the range of from about 10–30 mg/100 ml, most preferably no more than 20 mg/100 ml; while an inherent level for sodium can be in the range of from about 20–40 mg/100 ml, most preferably at least 30 mg/100 ml. These levels are inherent from the beverage components. Although it may be considered of higher nutritional value to have the nutritional beverage contain the foregoing minerals or macro-nutrients, the presence of these minerals reduces the clarity and textural properties of the inventive beverage. Thus, it is one aspect of the present invention that the beverage not be supplemented with, or essentially devoided of added macro-nutrients.

The macro-nutrients are generally recognized as sodium, calcium, magnesium, phosphorus, chlorine or chloride and potassium. The beverage of this invention should not have these elements added unless as a micro-nutrient, such as potassium iodide. An aspect of the present invention resides in the discovery that intentional addition of substantial amounts of Na, Ca, Mg, P, Cl and K will prevent the desired properties of a clear, thin texture product having a juice-like mouth feel and a high caloric content.

High caloric content is important since many patients which usually consume a milk-based product like Ensure® complete nutrition, from Ross Products Division of Abbott Laboratories often desire another flavor or taste but still need the necessary calories to maintain an appropriate level of nutrition. The beverage of this invention provides an adequate level of caloric intake in an attractive and palatable form.

There is no fat component to this invention other than the fat content inherent to the raw materials such as the whey protein. Thus, the product of the invention is essentially devoid of added fat.

The final pH of the nutritional supplement beverage of this invention and the protein pre-mixed are critical and should be adjusted by addition of food grade HCl, malic acid, citric acid, phosphoric acid; or mixtures thereof. The preferred acids to modify the pH of the formulation are hydrochloric acid (HCl), citric acid and malic acid. A mixture of these acids provides the best balance of flavor, clarity and texture (mouth feel) in a formulation that contains up to 10% protein by weight and a significantly high caloric density (greater than 1.00 kcal/ml). Of the total acid system about 20–40 wt. % of 37% hydrochloric, 100% citric and 100% malic acid is preferred in this invention.

One aspect of the present invention relates to simultaneously achieving a clear, thin, high caloric content beverage that contains trace, ultra-trace minerals and vitamins. Those skilled in the nutritional arts will readily appreciate what materials would provide the trace and ultra-trace minerals. Representative of the ultra-trace minerals useful in the present invention are: selenium, chromium and molybdenum. Representative of the trace minerals useful in the present invention are: iron, zinc, iodine, copper and manganese.

An additional aspect of the present invention relates to simultaneously achieving a clear, thin, high caloric content beverage that contains vitamins. Those skilled in the nutritional arts will readily appreciate what materials can be used to accomplish the vitamin addition. Representative of the vitamins useful in the present invention are: pantothenic acid, biotin, vitamin $B_{12}$, folic acid, vitamin $B_6$, niacin, riboflavin, thiamine and vitamin C.

The product of this invention may also be carbonated using conventional technology to produce a beverage having a distinctive flavor.

The method of the present invention contains the critical feature of the addition of acid to an aqueous solution of whey protein isolate so as to adjust the pH prior to addition of the carbohydrate portion. It has been found by the inventors that acidification of a protein/carbohydrate blend results in a finished product which has unacceptably high viscosity and a cloudy appearance. The order of addition is also critical to the instant invention. Accordingly, the method of the present invention involves producing a nutritional supplement beverage through the following steps: (1) preparing (a) an aqueous solution of whey protein isolate and (b) an aqueous solution of at least one source of carbohydrate; (2) adding acid to said aqueous solution of whey protein so as to bring the pH of said solution to within the range of from about 2.8 to about 3.3 (to prevent denaturation of the whey proteins so they are more completely soluble). Acidification of the whey protein isolate slurry to a pH of 3.5 and above results in a finished product with an unacceptably high viscosity and a cloudy appearance. Therefore, for the beverage of this invention to possess the desirable textural and visual attributes and contain a significantly high caloric density (greater than 1.00 kcal/ml) a pH of below 3.5 is required, preferably a pH of 2.8–3.3; (3) combining the aqueous solution of acidified whey protein isolate and the aqueous solution of carbohydrate(s) so as to produce a combined solution; and (4) subjecting the combined solutions to a high temperature short time process (HTST), followed by homogenization (if required) to produce a beverage that is clear and possesses a thin texture. The protein solution/slurry may be homogenized prior to the pH adjustment.

The beverage of this invention should be supplemented with trace minerals, ultratrace minerals and vitamins (preferably as a water dispersible vitamin A, B, E and K premix and oil soluble vitamins). The water dispersible vitamin premix are preferably added during the initial step of forming the protein solution and prior to the acid addition. The source of vitamin A may be vitamin A palmitate, acetate or beta-carotene.

An additional aspect of the present invention relates to the beverage's thin texture. It has been determined that to achieve the goals of thin texture and good mouth feel the viscosity of the product should be less than 15 centipoise as determined by a Brookfield viscometer at 72° (22° C.) using a number one spindle at 60 RPM.

The invention also includes a nutritional supplement beverage produced in accordance with the method described herein.

DETAILED DESCRIPTION OF THE PREFERRED EMBODIMENT

In accordance with the foregoing summary of the invention, the following Example I is one embodiment of the beverage of the present invention and a method of its production. Examples II, III and IV are comparative experiments outside the scope of this invention and illustrate a few of the critical elements of this invention.

For making a large quantity of the nutritional supplement beverage in accordance with the present invention, the whey protein isolate is first dissolved in water at approximately 125° F. (52° C.). The resultant protein slurry is then adjusted into a pH range of from 2.8 to 3.3 through the use of an appropriate acid system (i.e. hydrochloric, malic and citric acids). The carbohydrate portion of the beverage is prepared by dissolving the desired carbohydrate in water at approximately 175° F. (79° C.). The resulting carbohydrate slurry is then added to the pH-adjusted protein slurry. This mixture is then subjected to a high temperature-short time (HTST) process at about 165° F. (74° C.) for 16 seconds; followed by homogenization at 2500 psig (17,237 kPa).

It is preferred that the major portion of the carbohydrate component be a complex carbohydrate, preferably a high maltodextrin content mixture of 75% maltodextrin with a DE of between 10 and 20, preferably 20, and 25% sucrose.

Following the HTST process, the mixture is then cooled to approximately 40° F. (4° C.). To this mixture is then added trace mineral, ultratrace mineral and vitamin premixes. Such minerals may include potassium iodide and/or sodium selenite which are not considered as additional macro-nutrients. A premix of vitamins, folic acid and niacinamide may also be added. Colorings and flavorings also may be added, as may vitamin C. The following example shows how the nutritional supplement beverage may be batch processed.

EXAMPLE I—THE INVENTION

Batching/Processing (Lemon-Lime):

1. 7026 kg water was placed in a blend tank. The water was heated to 125° F. (51° C.) and 1080 kg of whey protein isolate was added and mixed until clear.

2. The protein slurry was acidified by adding the selected acid system:

a) 69 kg malic acid and 69 kg citric acid was dissolved in 300L water heated to 100° F. (38° C.). This solution was added to the protein slurry.

b) 75 kg of 37% hydrochloric acid (HCl) was diluted in 150L of cold water and added to the protein slurry with good mixing.

3. The protein/acid slurry was mixed until clear and then the pH (specification range 2.8–3.3) was adjusted (if required).

4. The carbohydrate mixture was prepared by placing 11280 kg of water in a blend tank and heating to 175° F. (80° C.):

a) 1565 kg sucrose and 4903 kg maltodextrin with a DE of 20 was added and mixed until clear.

b) 5.732 kg of minerals and ultra trace mineral premix was added to 950L water at 150° F. (66° C.). 1.7 g sodium selenite and 5.3 g potassium iodide was added and mixed until clear. This solution was added to the carbohydrate blend.

5. The carbohydrate/mineral slurry was added to the protein/acid slurry and blended for 5 minutes.

6. The combined slurries were processed as follows: HTST at 165° F. (74° C.) with hold time of 16 seconds, cool to 40° F. (4.4° C.) and homogenize at 2500 psig (17,237 kPa).

7. Pump finished product to storage tank.

8. Standardize the processed batch as follows:

a) Add 850 L water to a tank and heat to 100° F. (38° C.). Add 985 g water soluble premix, 341 g niacinamide and 25 g folic acid and mix. Add this water soluble premix to the finished product tank.

b) Dilute 28.3 kg Lemon-Lime liquid color with 200L cold water and add to the finished product tank.

c) Dilute 50.8 kg Lemon-Lime liquid flavor with 200L cold water and add to the finished product tank.

9. Test completed blend for required parameters prior to release to-fill testing.

10. Dissolve 4737 g ascorbic acid in cold water and add to finished product just prior to aseptic filling.

Aseptic Processing and Filling:

1. Transfer product from finished product storage tank to the balance tank.

2. Homogenize at 400 psig (2758 kPa).

3. Heat to 220° F. (104° C.) and hold for an average time of 20 seconds.

4. Cool to 70° F. (21.1° C.).

5. Transfer to aseptic surge tank and aseptically fill a suitable container with the beverage.

The nutritional supplement beverage produced in accordance with the present invention results in a clear, thin beverage which gives a refreshing mouth feel and is useful as a protein/carbohydrate nutritional supplement. These beverages also have the advantage of having relatively high caloric density (typically above 1.00 kcal/ml) and relatively high protein content (typically about 4.0 grams per liter).

Table I presents a nutrient profile typical of those achieved in accordance with Example I.

TABLE I

| Nutrient per 100 ml | Range |
| --- | --- |
| Protein (g) | 3–5 |
| Carbohydrate (g) | 20.0–30.0 |
| Energy Density (Kcal) | 92–140 |
| Sodium (mg) | 22.5–37.5 |
| Potassium (mg) | 16.5–27.5 |
| Chloride (mg) | 75–175 |
| Calcium (mg) | 24–40 |
| Phosphorous (mg) | 5–15 |
| Magnesium (mg) | 4–10 |
| Iron (mg) | 1.2–2.0 |
| Zinc (mg) | 1.5–2.5 |
| Copper (mg) | 0.14–0.23 |
| Manganese (mg) | .30–.60 |
| Iodine (ug) | 18–30 |
| Molybdenum (ug) | 13–23 |
| Chromium (ug) | 9–15 |
| Selenium (ug) | 8–15 |
| Vitamin A (IU) | 1000–2000 |
| Vitamin D (IU) | 20–40 |

TABLE I-continued

| Nutrient per 100 ml | Range |
| --- | --- |
| Vitamin E (IU) | .5–2.5 |
| Vitamin K (umg) | 7.5–12.5 |
| Vitamin C (mg) | 5–30 |
| Vitamin B1 (mg) | 0.15–0.25 |
| Vitamin B2 (mg) | 0.13–0.21 |
| Vitamin B6 (mg) | 0.14–0.24 |
| Vitamin B12 (ug) | 0.38–0.63 |
| Niacin (mg) | 2.1–3.5 |
| Folic Acid (ug) | 30–50 |
| Biotin (ug) | 22.5–37.5 |
| Pantothenic Acid (mg) | 0.3–0.5 |

EXAMPLE II—COMPARATIVE

The experiment was conducted to demonstrate that the use of a whey protein isolate is critical for attaining the goals of this invention. 3396 g of water was heated to 80° F. (27° C.) and 223 g of whey protein concentrate from New Zealand Milk Products, Inc. was added and mixed to form a slurry. Phosphoric acid was added to the slurry to reduce the pH to 3.6 and the mixture was heated to 175° F. (80° C.). 213 g of sucrose and 674 g of maltodextrin with a DE of 20 was then added and the mixture was stirred. The product was further processed in a usual manner. The resulting finished product was cloudy and yellow in color. The experiment demonstrates that use of a whey protein concentrate which contains fat and lactose is not suitable for the production of a clear beverage.

EXAMPLE III—COMPARATIVE

This experiment was conducted to demonstrate that a pH of 2.8 to 3.3 is critical for obtaining the goals of this invention. 3117 g of water was heated to 125° F. (52° C.) and 184 g of whey protein isolate (Proyon) was added and mixed until clear. The pH of the protein solution was adjusted by (1) adding 50% phosphoric acid to reduce the pH to 4.5 and then (2) 50% malic/citric acid was added to reduce the pH to 4.0. The mixture was heated to 165° F. (74° C.) and 178 g of sucrose and 878 g of maltodextrin was added and stirred. Vitamins, trace minerals and ultra-trace minerals were then added and the mixture was then processed in a usual manner. The resulting product was milky white in appearance and possessed a very thick texture or mouth feel. This experiment demonstrates that a pH of less than 4.0 is required to achieve the goals of this invention.

EXAMPLE IV—COMPARATIVE

This experiment was conducted to demonstrate that acidification of the protein slurry prior to mixing with the carbohydrate slurry is critical to obtaining the goals of this invention. More specifically, this experiment shows that acidification of a protein/carbohydrate slurry results in an unacceptable product.

1397 g of water was heated to 125° F. (52° C.) and 184 g of whey protein isolate (Provon) was added and stirred until clear. In a separate vessel 857 g of water was heated to 175° F. (80° C.) and 275 g of sucrose and 868 g of maltodextrin and trace minerals and ultra-trace minerals were added and stirred until clear. The protein and carbohydrate slurries were then combined and stirred for 5 minutes. 121 g of malic acid and 12 g of citric acid were added to 50 g of water. The acid solution was then added to the protein/carbohydrate slurry. 13 g of 37% hydrochloric acid was then added to the protein/carbohydrate slurry. The mixture was then processed in a usual manner. The resulting product was cloudy and possessed a slightly thick texture.

This experiment demonstrates that acidification of the protein slurry prior to combination with the carbohydrate slurry is required to achieve a clear beverage that possesses a thin texture.

Although the products may be fortified with additional major minerals or macro-nutrients (Ca, Mg, Cl, P, K, Na), it has been found that the addition of these minerals has an adverse effect on the product's textural and appearance properties. Accordingly, the products in the preferred embodiment of the present invention contain only those amounts of major minerals inherent to the raw materials used, (such as through the protein, carbohydrate and ingredient water). The products of the present invention may be fortified with trace and/or ultratrace minerals and/or vitamins without detrimental impact to the textural and appearance properties of the product.

The nutritional supplement beverage of the present invention can be made in ready to consume form, in the form of a concentrate, a frozen sorbet or powder form and may be flavored with natural and/or artificial flavors and/or fruit juice concentrates. The beverage of this invention may also be carbonated. The nutritional beverage of the present invention, due to its thinness and clarity, was found to produce a refreshing, tart juice-like mouth feel at a significantly high caloric density (greater than 1.00 kcal/ml at 3–5% protein by wt.).

The nutritional supplement beverage of the present invention may be packaged in accordance with materials and methods used in the packaging art.

Industrial Applicability

Some patients in need of nutritional supplementation simply do not like or cannot tolerate milky supplements. These patients may also suffer from taste fatigue which can hinder compliance. The product of this invention will offer malnourished patients a new variety of supplement that will improve intake and thereby improve nutritional status. The product of this invention provides a high level of energy and protein in a clear, juice-type supplement which will be found useful in the medical community.

The product of this invention is intended to be used as a necessary nutritional supplement for patients with the following conditions: disease related malnutrition, short bowel syndrome; proven inflammatory bowel disease; bowel fistulae; pre-operative preparation of patients who are malnourished; treatment following total gastrectomy; dysphagia; and intractable malabsorption.

In accordance with the foregoing disclosure, it will be within the ability of one skilled in the relevant arts to make modifications to the present invention, such as through the substitution of equivalent materials and/or their amounts, without departing from the spirit of the invention as reflected in the appended claims.

What is claimed is:

1. A substantially clear liquid nutritional supplement comprising:

(1) water;

(2) from about 1% to about 10% by weight whey protein isolate;

(3) at least one source of carbohydrate, said carbohydrate having a DE of at least 10;

(4) vitamins, trace minerals and ultra trace minerals;

and wherein the pH of said nutritional supplement beverage is in the range of from about 2.8 to about 3.3, and wherein the caloric density of said nutritional supplement beverage is at least 1.00 kcal/ml and wherein said nutritional supplement beverage is essentially devoid of added macro-nutrients and fat and wherein the liquid nutritional supplement is produced through a method comprising the steps of:
(i) preparing (a) an acidified aqueous solution of whey protein isolate having a pH of about 2.8 to about 3.3 and (b) an aqueous solution of at least one source of carbohydrate;
(ii) adding the aqueous solution of at least one source of carbohydrate to the acidic aqueous solution of whey protein isolate so as to produce a combined solution.

2. A nutritional supplement beverage according to claim 1 wherein said whey protein isolate is present in the range of from about 3% to about 5% by weight.

3. A nutritional supplement according to claim 1 wherein in the ready to feed form it has a viscosity of less than 15 centipoise as determined by a Brookfield viscometer at 72° F. using a #1 spindle at 60 RPM.

4. A nutritional supplement beverage according to claim 1 wherein at least one source of carbohydrate is selected from the group consisting of sucrose, glucose, maltodextrin, fructose, and corn syrup solids.

5. A nutritional supplement according to claim 4 wherein the maltodextrin has DE of at least 15.

6. A nutritional supplement beverage according to claim 1 wherein the pH of said nutritional supplement beverage is adjusted by a mixture of HCl, malic acid, and citric acid.

7. A nutritional supplement according to claim 1 wherein the source of carbohydrate consists of a mixture of maltodextrin and sucrose.

8. A liquid nutritional supplement beverage according to claim 1 wherein the caloric density is at least 1.20 kcal/ml as fed.

9. A liquid nutritional supplement beverage according to claim 1 wherein the caloric density is at least 1.25 kcal/ml as fed.

10. A method of producing a substantially clear, liquid nutritional supplement beverage, comprising the following steps:
(1) preparing (a) an acidified aqueous solution of whey protein isolate having a pH of about 2.8 to about 3.3 and (b) an aqueous solution of at least one source of carbohydrate having a DE of at least 10;
(2) adding the aqueous solution of at least one source of carbohydrate to the acidic aqueous solution of whey protein so as to produce a combined solution.

11. A nutritional supplement beverage produced in accordance with the method of claim 10.

12. The method of producing nutritional supplement beverage according to claim 10, wherein the acidified aqueous solution of whey protein is prepared by using at least one acid selected from the group consisting of hydrochloric and phosphoric acid; and at least one acid selected from the group consisting of citric, malic and lactic acids.

13. A substantially clear liquid nutritional supplement comprising:
(1) water;
(2) from about 3% to about 5% by weight of whey protein isolate;
(3) a source of carbohydrate comprising a mixture of sucrose and maltodextrin with a DE of at least 15 and wherein the carbohydrate is 15–25% sucrose and 65–85% maltodextrin by weight;
(4) vitamins, trace minerals and ultra trace minerals;
(5) flavors and food grade colors;
(6) an acid system comprising a mixture of hydrochloric, malic and citric acids; and wherein the pH of said nutritional beverage is in the range from about 2.8–3.0; and wherein the caloric density of said nutritional supplement beverage is at least 1.20 kcal/ml and wherein said nutritional supplement beverage is essentially devoid of added macro-nutrients and fat and wherein the liquid nutritional supplement is produced through a method comprising the steps of:
(i) preparing (a) an acidified aqueous solution of whey protein isolate having a pH of about 2.8 to about 3.3 and (b) an aqueous solution of at least one source of carbohydrate;
(ii) adding the aqueous solution of at least one source of carbohydrate to the acidic aqueous solution of whey protein isolate so as to produce a combined solution.

14. A substantially clear, liquid nutritional supplement prepared by the method comprising:
adding an aqueous solution of at least one source of carbohydrate having a DE of at least 10, to an acidified aqueous solution of whey protein isolate having a pH of about 2.8 to about 3.3 so as to produce a combined solution having a caloric density of at least 1.00 kcal/ml, having from about 1% to about 10% by weight whey protein isolate and being essentially devoid of added macro-nutrients and fat; and
optionally adding vitamins, trace minerals and ultra trace minerals.

15. A substantially clear, liquid nutritional supplement comprising:
an acidified aqueous solution of whey protein isolate having a pH of about 2.8 to about 3.3 to which has been added an aqueous solution of at least one source of carbohydrate having a DE of at least 10, to produce a combined solution having a caloric density of at least 1.00 kcal/ml, having from about 1% to about 10% by weight whey protein isolate and being essentially devoid of added macro-nutrients and fat; and
optionally including vitamins, trace minerals and ultra trace minerals.

* * * * *